United States Patent [19]

Kupfert et al.

[11] 4,003,452
[45] Jan. 18, 1977

[54] BRAKE SEAL

[75] Inventors: Bernard F. Kupfert, Peoria; Richard L. Augustine, Washington, both of Ill.

[73] Assignee: Caterpillar Tractor Co., Peoria, Ill.

[22] Filed: June 10, 1976

[21] Appl. No.: 694,630

[52] U.S. Cl. .................... 188/71.6; 188/264 E
[51] Int. Cl.² ........................... F16D 65/853
[58] Field of Search ......... 188/71.6, 264 B, 264 D, 188/264 E; 192/113 R, 113 B

[56] References Cited
UNITED STATES PATENTS

| | | | |
|---|---|---|---|
| 3,136,389 | 6/1964 | Cummins | 188/71.6 |
| 3,580,369 | 5/1971 | Heck | 188/264 E |
| 3,680,666 | 8/1972 | Sommer | 188/71.6 |

Primary Examiner—Duane A. Reger
Attorney, Agent, or Firm—Wegner, Stellman, McCord, Wiles & Wood

[57] ABSTRACT

A disc brake assembly having a brake chamber provided with pressurized cooling oil and an annular face seal sealing the hub of the brake assembly to the housing thereof against loss of cooling oil from the brake chamber. A second seal is provided for sealing the hub to the brake housing inwardly of the face seal and structure is provided for conducting lubricating oil from a differential chamber of the assembly to the face seal for maintaining a preselected lubrication and cooling of the face seal while preventing delivery of the pressurized cooling oil from the brake chamber thereto. In one form, the seal for sealing the hub to the brake housing inwardly of the face seal is received in a recess of the housing, and in another form, the seal is carried on a retainer projecting inwardly from the housing to adjacent the hub. The face seals are lubricated by oil delivered from a differential chamber through a passage in the hub. The passage may include a spline connection to the hub communicating with the differential chamber.

12 Claims, 3 Drawing Figures

U.S. Patent  Jan. 18, 1977  4,003,452
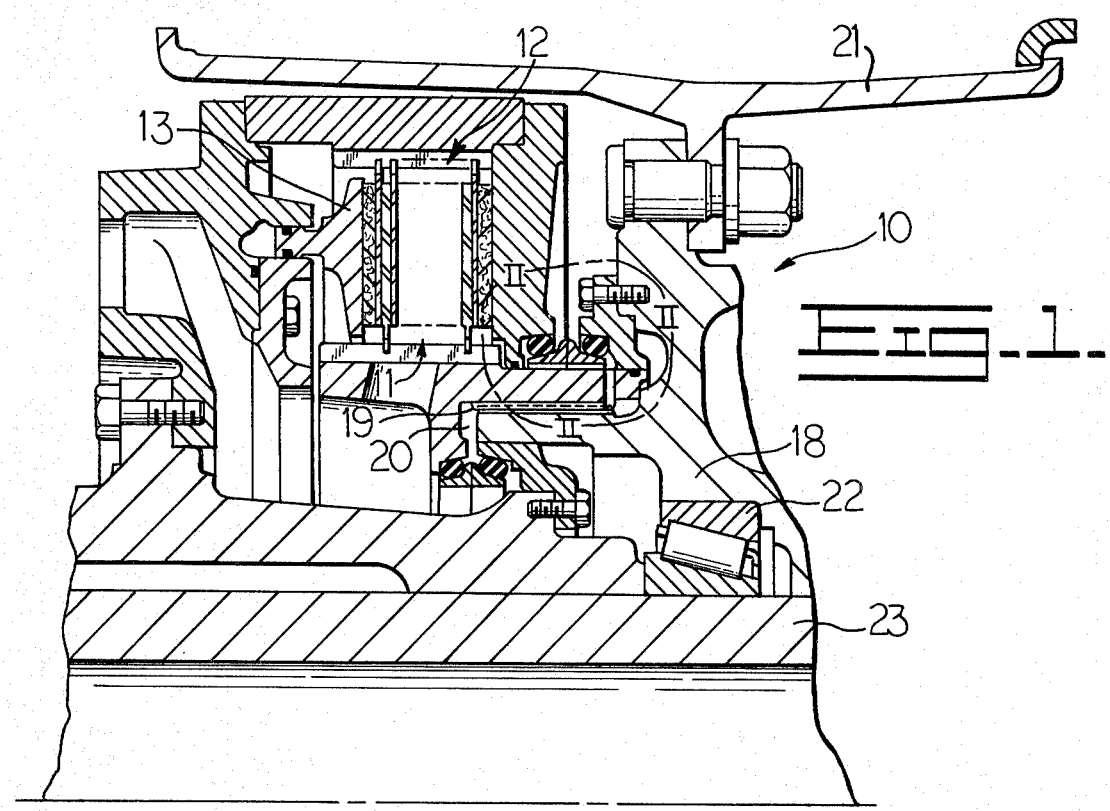
Fig. 1.
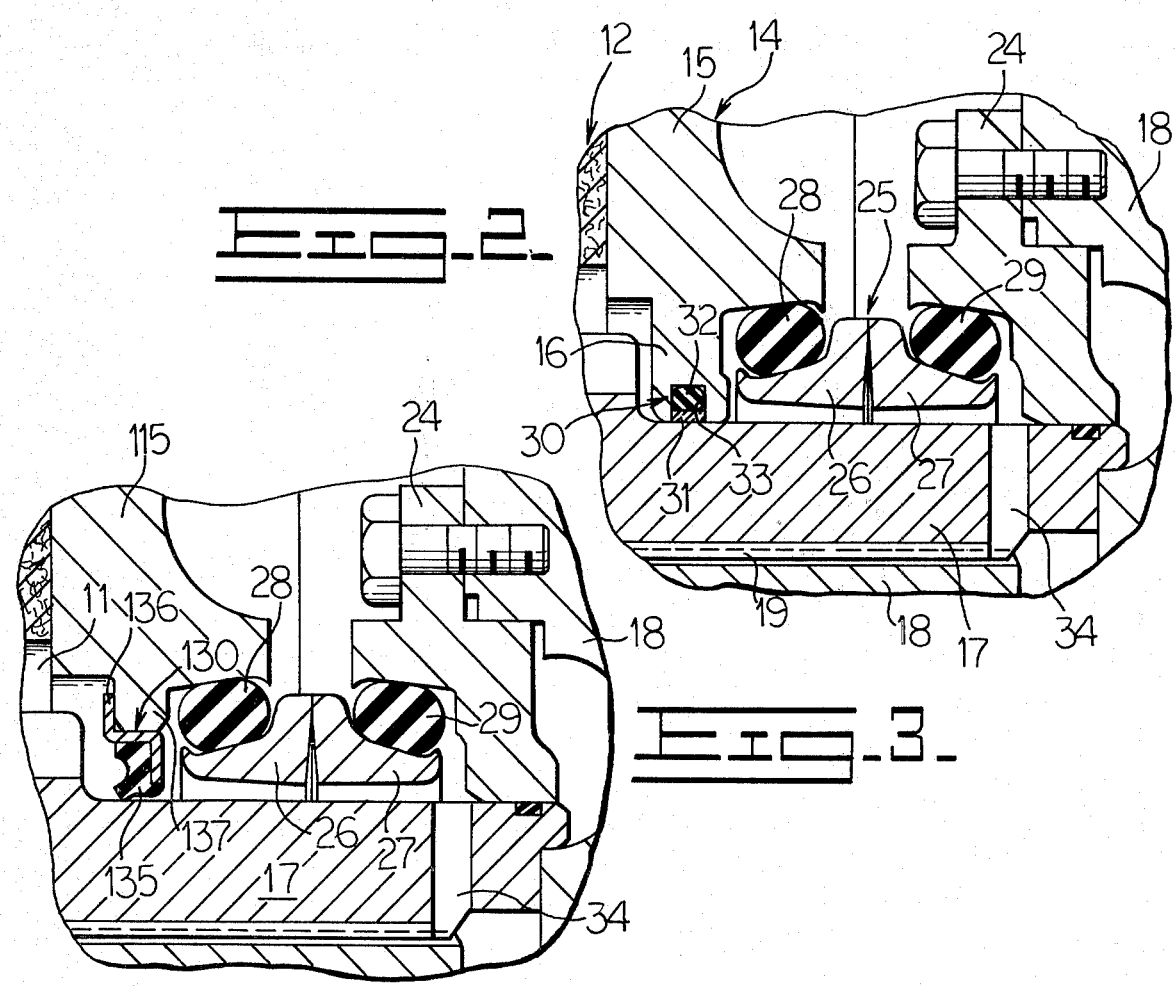
Fig. 2.
Fig. 3.

4,003,452

BRAKE SEAL

BACKGROUND OF THE INVENTION

1. Field of the Invention

This invention relates to fluid seals and in particular to an assembly wherein face seals are protected from pressure surges by a supplemental seal while being lubricated and cooled from a low pressure lubricant source.

2. Description of the Prior Art

In copending U.S. Letters Patent application Ser. No. 524,115, of Lawrence F. Schexnayder, for a Sealing Arrangement for Brake Housing, which is owned by the assignee hereof, an improved sealing structure is disclosed utilizing face seals and means for effectively preventing high pressure fluid conditions from adversely affecting the operation and life of the face seals. In the Schexnayder sealing structure, a buffer seal is provided for defining a flow restriction means to regulate the pressure of the coolant fluid delivered from the brake means therethrough to the face seals.

As disclosed in said application, the improved sealing structure thereof comprises an improvement over the prior structures of U.S. Pat. Nos. 3,180,648, of Bernard F. Kupfert et al, U.S. Pat. No. 3,072,220, of Elmer R. Bernson et al, and U.S. Pat. No. 3,136,389, of Curtis F. Cummins, each of which patents is owned by the assignee hereof. As disclosed in the Schexnayder application, the Kupfert et al patent discloses an improved ring-type face seal for sealing confronting surfaces of relatively rotatable parts. Lubricant is introduced under pressure into the apparatus and the seals are adapted to provide improved fluid sealing against such pressure.

In the Bernson et al and Cummins patents, these seals are used in conjunction with oil-cooled disc brakes.

As further pointed out in the Schexnayder application, a number of prior devices have been developed for balancing pressures in fluid-control devices. Illustratively, in Floyd S. Dadds et al U.S. Pat. No. 3,679,216, owned by the assignee hereof, a pressure-balanced track roller for underwater use is disclosed having piston or diaphragm means for maintaining face loads on the seal rings when the track roller is operated at substantial depths.

Additionally, Archibald S. Telfer U.S. Pat. No. 1,474,454 and 1,737,870, show a centrifugal pump utilizing pressure-balancing means; Kenton D. McMahan et al U.S. Pat. No. 2,575,923 shows a method and apparatus for pumping volatile liquids utilizing pressure-balancing means; and Robert W. Erikson et al U.S Pat. No. 2,931,314 shows an air purging apparatus for pumps permitting purging of the air to atmosphere and rapid closure of the pressure responsive valve on pump shutdown.

SUMMARY OF THE INVENTION

The present invention comprehends an improved disc brake assembly wherein an annular face seal is lubricated by lubricating oil delivered thereto from a differential chamber of the assembly. A rotating seal is interposed between the face seal and the brake chamber so as to prevent subjection of the face seal to the relatively high and varying pressure of the brake chamber coolant.

In the illustrated embodiment, the lubricating oil is delivered to the face seal through a passage in the brake hub which extends radially so as to cause the lubricating oil to be delivered thereto by centrifugal force from the rotating brake hub.

The lubricating oil may be delivered to the radial passage through splines on the brake hub communicating with the differential chamber.

The means for sealing the hub to the brake housing inwardly of the brake seal effectively acts as a dam.

In one form, the sealing means comprises a recess in the housing with a rubber biasing means disposed in the recess and a synthetic resin sealing member disposed outwardly of the biasing means and in sliding engagement with the rotating brake hub. More specifically, in the illustrated embodiment, the sealing member comprises a Teflon member.

In another embodiment, the sealing means comprises a lip seal carried by a retainer in turn carried on the backup plate portion of the housing of the brake assembly.

Thus, the improved sealing structure of the present invention effects a long, trouble-free life of the face seals by minimizing the pressure acting against the toric elastomeric supports. More specifically, in vehicles, such as off-highway trucks, utilizing brake-cooling oil for the pressure fluid in the dumping operation, the actuation and deactuation of the hydraulic dump cylinder provides pressure surges which could adversely affect the life of the face seals if allowed to act against the toric supports and seals. The use of the sealing dam prevents such pressure surges from affecting the face seals. Use of the relatively low pressure centrifugally flowed differential lubricating oil provides a substantial increase in the useful life of the face seals.

Thus, the improved sealing means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a fragmentary section of a disc brake assembly having an improved sealing means embodying the invention;

FIG. 2 is a fragmentary enlarged section of the sealing means of FIG. 1; and

FIG. 3 is a fragmentary enlarged section of a modified form of sealing means for use in the disc brake assembly of FIG. 1.

DESCRIPTION OF THE PREFERRED EMBODIMENTS

In the exemplary embodiment of the invention as disclosed in FIGS. 1 and 2 of the drawing, a disc brake assembly generally designated 10 is shown to define a brake chamber generally designated 11 which is conventionally provided with pressurized cooling oil. A brake disc pack generally designated 12 is disposed within chamber 11 for suitable operation by a piston 13 for effecting a braking operation when desired.

Referring now to FIG. 2, the brake disc pack 12 is received within a brake housing generally designated 14 defining a back-up plate 15 having an annular flange 16 extending to adjacent a brake hub 17, which is connected to a wheel hub 18 by a spline 19. As shown in FIG. 1, the spline communicates at its inner end with a differential chamber 20 which may be provided with lubricating oil.

A wheel 21 is carried on the hub 18 which, in turn, is journaled on bearings 22 carried on a fixed shaft 23. Wheel hub 18 carries a retainer 24 which cooperates with back-up plate 15 to define a seal space generally designated 25 in which is provided a pair of face seal rings 26 and 27 supported by a pair of toric supports 28 and 29, respectively. Support 28 is resiliently compressed between back-up housing plate 15 and rotating seal ring 26. Toric support 29 is resiliently compressed between retainer 24 and stationary seal ring 27. The toric supports urge the face seals together to provide an improved movable seal therebetween.

As indicated briefly above, the pressure of the brake coolant in chamber 11 may vary substantially and have substantial surges. In a number of prior art devices, however, the coolant fluid has been utilized to cool and lubricate the face seals. The present invention comprehends the provision of a sealing means generally designated 30 inwardly of the face seals and chamber 25 to provide a moving seal acting as a dam for preventing the application of coolant pressure fluid against the face seals.

Thus, as shown in FIG. 2, sealing means 30 may include a seal member 31 and a biasing member 32 received in a recess 33 in flange 16. The biasing member 32 may be formed of a suitable resilient material, such as rubber, and is arranged to urge the sealing member 31 slidably against the brake hub 17 to prevent pressurized fluid from acting from chamber 11 on the face seal rings 26 and 27. In the illustrated embodiment, the sealing member 31 is formed of a synthetic resin, such as Teflon.

To provide cooling lubrication of the face seal in the use of the apparatus, a radial passage 34 is provided in the brake hub 17 opening outwardly to the space 25 and inwardly to the spline 19. Thus, lubricating oil may flow through the spline and radially outwardly by centrifugal force through the passage 34 to the space 25 for cooling and lubricating the face seals 26 and 27 during operation of the apparatus.

Referring now to the embodiment of the invention illustrated in FIG. 3, a modified form of sealing means generally designated 130 is shown to comprise an annular lip seal 135 carried on a retainer 136 mounted to a small flange portion 137 of the back-up plate 115 of the housing. Pressure of the coolant fluid in chamber 11 acting against lip seal 135 effectively causes a seal of the brake hub 17 to the housing portion 115 so as to effectively preclude the application of brake coolant fluid pressure to the face seals and toric supports, thereby similarly providing the improved functioning of the apparatus as described relative to the embodiment of FIGS. 1 and 2.

In the illustrated embodiments, the radial passage means 34 may comprise a plurality of such passages, and more specifically in the illustrated embodiment, comprises three such passages arranged at 120° circumferentially spaced positions relative to the hub 17. Thus, a uniform, low pressure delivery of lubricating fluid is provided to the face seals for improved cooling and lubrication thereof during operation of the apparatus.

The foregoing disclosure of specific embodiments is illustrative of the broad inventive concepts comprehended by the invention.

What is claimed is:

1. In a disc brake assembly having means defining a brake chamber provided with pressurized cooling oil, a brake housing, means defining a differential chamber provided with lubricating oil, a rotatable hub, and an annular face seal for sealing the hub to the brake housing against loss of the cooling oil, the improvement comprising:
    sealing means for sealing the hub to the brake housing inwardly of the face seal; and
    means for conducting lubricating oil from said differential chamber to said face seal for maintaining a preselected lubrication and cooling of said face seal.

2. The disc brake assembly of claim 1 wherein said means for conducting lubricating oil comprises a passage through said hub.

3. The disc brake assembly of claim 1 wherein said means for conducting lubricating oil comprises a passage through said hub having a radial outer portion arranged to deliver the lubricating oil therefrom by centrifugal force developed by rotation of said hub.

4. The disc brake assembly of claim 1 wherein said sealing means comprises a recess in said housing adjacent said hub, and a seal member in said recess biased against said rotatable hub.

5. The disc brake assembly of claim 1 wherein said sealing means comprises a recess in said housing adjacent said hub, and a seal member in said recess biased against said rotatable hub including a resilient biasing member in said recess, and a seal member outwardly of said biasing member and urged thereby sealingly against said hub.

6. The disc brake assembly of claim 5 wherein said biasing member is formed of rubber.

7. The disc brake assembly of claim 5 wherein said seal member is formed of a synthetic resin.

8. The disc brake assembly of claim 1 wherein said sealing means comprises a lip seal sealingly engaging said hub and a retainer carried by said housing and carrying said lip seal.

9. The disc brake assembly of claim 1 wherein said means for conducting lubricating oil comprises a passage through said hub having a plurality of circumferentially spaced radial outer portions arranged to deliver the lubricating oil therefrom by centrifugal force developed by rotation of said hub.

10. The disc brake assembly of claim 1 wherein said face seal comprises a pair of toric supports and a pair of seal rings respectively carried by said supports.

11. The disc brake assembly of claim 1 wherein said means for conducting lubricating oil comprises a spline connection to said hub defining a passage communicating with said differential chamber.

12. The disc brake assembly of claim 1 wherein said conducting means includes means responsive to rotation of said hub for delivering said lubricating oil to said face seal.

* * * * *